United States Patent [19]

Heathe

[11] Patent Number: 4,770,539
[45] Date of Patent: Sep. 13, 1988

[54] BARRIER SCREW

[75] Inventor: William R. Heathe, Mississauga, Canada

[73] Assignee: Husky Injection Molding Systems Ltd., Bolton, Canada

[21] Appl. No.: 69,850

[22] Filed: Jul. 6, 1987

[51] Int. Cl.⁴ .............................................. B29B 1/06
[52] U.S. Cl. ...................................... 366/88; 366/76; 366/323
[58] Field of Search ........................ 366/76, 79, 69, 88, 366/89, 318, 321–323; 425/208, 209, 376 R; 264/349, 176.1; 100/37, 117, 145

[56] References Cited

U.S. PATENT DOCUMENTS

| | | |
|---|---|---|
| 3,487,503 | 1/1970 | Barr . |
| 3,530,534 | 9/1970 | Pomper . |
| 3,671,021 | 6/1972 | Pomper et al. . |
| 3,671,141 | 6/1972 | Kovacs . |
| 3,689,182 | 9/1972 | Kovacs . |
| 3,698,541 | 10/1972 | Barr . |
| 3,989,941 | 11/1976 | Gasior et al. . |
| 4,129,386 | 12/1978 | Rauwendaal ................... 366/323 X |
| 4,310,484 | 1/1982 | Blakeslee ........................ 425/208 X |
| 4,329,313 | 5/1982 | Miller et al. ......................... 264/349 |
| 4,330,214 | 5/1982 | Willert . |
| 4,341,474 | 7/1982 | Wheeler, Jr. et al. ................ 366/88 |

FOREIGN PATENT DOCUMENTS 5692039 2/1984 Japan .
5784830 3/1985 Japan .

OTHER PUBLICATIONS

Heung-Tai Kim, "High-yield Extruder Screw Melts and Pumps in Step", *Plastics Engineering*, Aug., 1985, pp. 27–30.

Primary Examiner—Timothy F. Simone
Attorney, Agent, or Firm—Bachman & LaPointe

[57] ABSTRACT

The present invention relates to a barrier screw having improved solids conveying capability. The barrier screw comprises a feed zone having a helical primary flight defining a solid material feed path, a transition zone for converting the solid material into molten material having a solids channel and a melt channel, and a metering zone for mixing molten plastic material from the melt path. In the feed zone, the helical flight defining the feed path is characterized by a substantially constant leading edge pitch and a trailing edge pitch which causes the thickness of the flight to increase as one moves along the screw barrel toward the beginning of the melt channel in the transition zone.

10 Claims, 1 Drawing Sheet

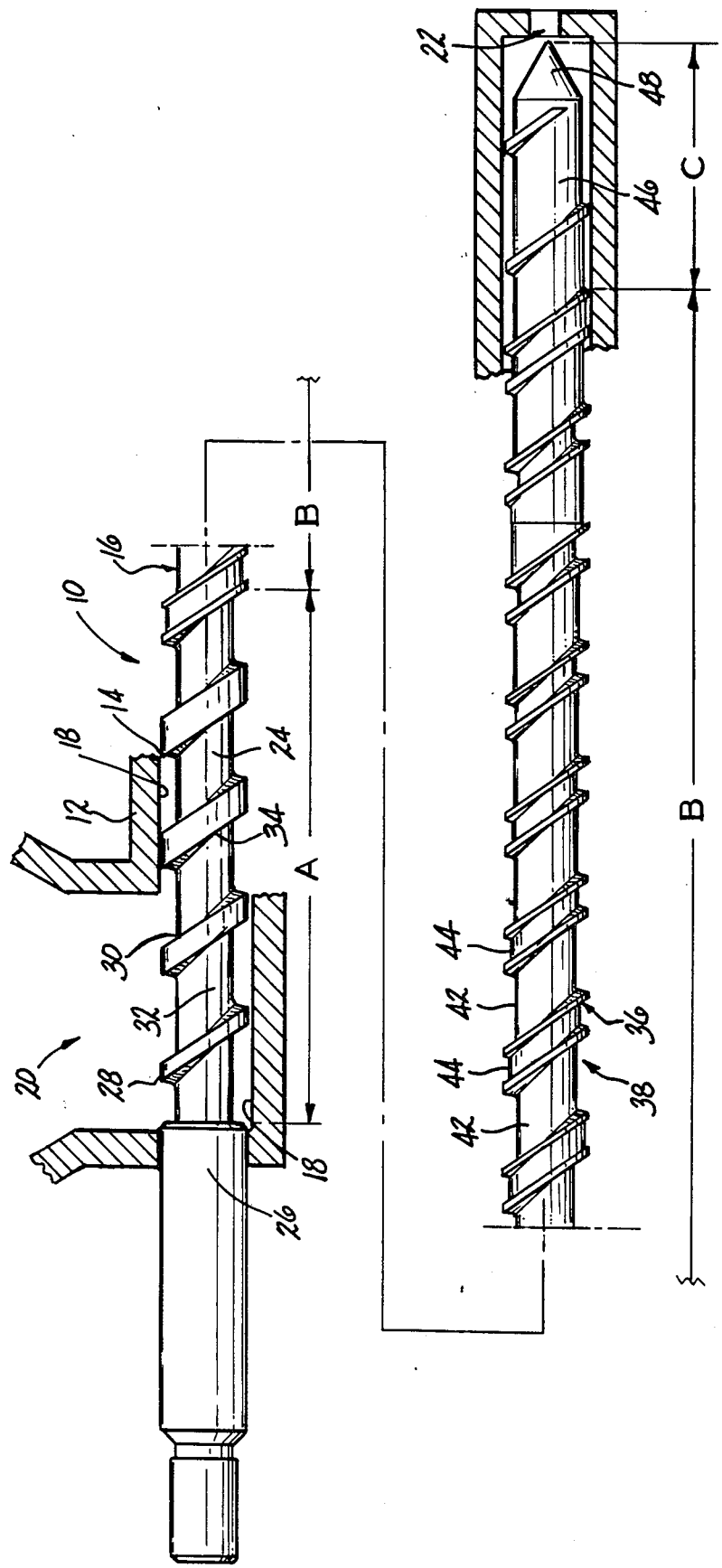

BARRIER SCREW

BACKGROUND OF THE INVENTION

The present invention relates to a barrier screw having improved solids conveying capability. The barrier screw is used in a plasticizing device for converting solid thermoplastic material to molten material.

In the preparation of plastic materials utilizing a single screw extruder and a conventional single stage screw having feed, transition and metering sections, the raw or unmelted thermoplastic is introduced into the feed section and advanced to the end of the metering section by means of a helical flight and rotation of the screw. As the thermoplastic material travels along the screw, it is heated by means of heat conduction from the heated barrel and by shear between the metal surfaces of the rotating screw, the stationary plasticizing barrel, and the plastic itself. It has been found that some unplasticized pellets become encapsulated in the hotter material or melt and travel the length of the screw without being fully melted and attaining uniformity of texture. Accordingly, improvement in the quality and uniformity of the melt from a plasticizing device has been a continuing source of focus by workers in this art.

A class of devices known as barrier screws have been developed in an attempt to deal with these problems. These devices typically have a plasticizing or transition zone with two parallel channels. A secondary or barrier flight is started usually at the beginning of the transition zone and creates the two channels, namely a solids channel and a melt channel. The barrier flight is undercut below the primary flight allowing melted plastic to pass over it. Typical barrier screws are illustrated in the article "High-yield Extruder Screw Melts and Pumps In Step," by Heung-Tai Kim, *Plastics Engineering*, August, 1985, pp. 27–30, in Japanese Patent Publication Nos. 56-92039 and 57-84830, and in U.S. Pat. No. 4,330,214 to Willert.

The Willert barrier screw has a feed zone, a plasticizing zone and a metering zone. The screw in the feed zone has a single primary flight which forms a single feed channel for moving solid material to the plasticizing zone. At the beginning of the plasticizing zone, a barrier flight is introduced to divide the feed channel into a solids channel and a melt channel. The solids channel is initially deeper than the feed channel but gradually decreases in depth as it approaches the end of the plasticizing zone. The melt channel on the other hand is shallow at the beginning but becomes deeper as it approaches the end of the plasticizing zone. As the melt channel deepens, the thickness of the shank decreases. One of the problems associated with this screw is the tendency for the shank to break in these thin regions.

SUMMARY OF THE INVENTION

The present invention relates to a plasticizing screw which is characterized by a feed zone having a solid material feed path, a transition zone for converting the solid material into molten material having a melt path defined by distinct solids and melt channels, and a metering zone for mixing molten plastic material from the melt path. To provide improved solids conveying, the primary flight defining the feed channel in the feed zone has a leading edge with a substantially constant pitch and a trailing edge with a pitch which causes thickness of the primary flight to increase as one moves along the screw barrel toward the beginning of the melt channel in the transition zone. It has been found that the barrier screw of the present invention produces a well-mixed, substantially homogeneous molten plastic material. In addition, there is less likelihood of shank braking due to the presence of very deep melt channels.

It is an object of the present invention to provide a barrier screw capable of providing a well mixed, substantially homogenous molten plastic material.

This and other objects and advantages will become more apparent from the following description and drawing in which like reference numerals depict like elements.

BRIEF DESCRIPTION OF THE DRAWINGS

The FIGURE is an elevational view of a barrier screw in accordance with the present invention.

DETAILED DESCRIPTION OF THE INVENTION

Referring to the FIGURE, the plasticizer 10 comprises a body 12 having a cylindrical bore 14 for housing the screw 16 of the present invention. The sidewalls 18 of the bore 14 closely surround the screw 16. The plasticizer 10 further includes at least one inlet 20 through which thermoplastic material to be plasticized is delivered, an outlet 22 through which the molten plastic material is discharged, and a suitable means not shown for heating the material. The heating means may comprise any suitable heating device known in the art. The screw 16 is rotatably mounted within the cylindrical bore 14 for rotation by a suitable drive mechanism (not shown) and is characterized by the presence of a feed zone A, a transition zone B, and a metering zone C.

The screw 16 in the feed zone A has a central body portion or barrel 24, a shank portion 26 and primary flight 28. The shank portion 26 is connected through any suitable means known in the art to the drive mechanism for rotating the screw. The flight 28 defines a feed channel 32 for supplying material to the transition zone B. The feed channel 32 preferably has a constant depth. It is designed to convey a desired volume of material to the transition zone B.

The primary flight is helical. It also is characterized by a leading edge 30 having a substantially constant leading edge pitch and a trailing edge 34 having a variable trailing edge pitch in the feed zone only. As used herein, the term "variable" means a pitch different from the pitch of the leading edge. As can be seen from the FIGURE, this variable or different trailing edge pitch causes the flight 28 to increase in thickness as one moves along the screw barrel towards the beginning of the melt channel 44 in the transition zone. It has been found that by providing such a primary flight construction one can improve the conveyance of solids along the screw.

The feed zone A receives material from the inlet 20 and is primarily intended to initiate solids conveying; however, some compaction and heating of the solid material ordinarily occurs.

The transition zone B is the zone in which the solid material is converted into molten material. It is characterized by the presence of a helical barrier flight 36 which with the primary flight defines a melt channel 44. The barrier flight 36 also serves to separate the melt channel 44 from a solids channel 42 which communicates with the feed channel 32.

The solids channel 42 initially has a depth equal to that of the feed channel. As one moves toward the metering zone C, however, the solids channel 42 becomes shallower. This forces the unmelted solid materials against the body 42 of the screw and sidewall 18 of the bore for melting. The melt channel 44 on the other hand is initially relatively shallow. As one moves toward the metering zone C, the melt channel 44 becomes deeper. By progressively increasing the depth of the melt channel, relatively low shear can be maintained between the screw 16 and the molten plastic. This significantly reduces the possibility of overheating the molten plastic. As in other barrier screws, the barrier flight 36 separating the solids and melt channels is undercut to allow molten plastic material to pass over it.

The metering zone C is characterized by the presence of a helical primary flight defining a metering channel 46 having one or more turns. In addition to metering the molten plastic stream from the transition zone, the metering zone C further refines the molten material.

In operation, the screw 16 is rotated at a desired speed and solid material is fed to the feed channel 32 through the inlets 20. Rotation of the screw 16 causes the solid material to be conveyed along the channel 32 to the melt path 38 in the transition zone B. In the transition zone B, the solids material from the feed channel enters the solids channel 42 where it is gradually heated by conduction from the sidewalls 18 and by viscous shearing action between the screw body 24 and the plastic material. The molten material passes over the barrier flight 36 separating the solid channel 42 and the melt channel 44. A molten plastic stream is generated in the transition zone and conveyed by rotation of the screw 16 to the metering zone C. In the metering zone, the stream is further blended into a well mixed, substantially homogenous molten plastic material.

The barrier screw of the present invention has been found to be quite advantageous. Its design has been found to be quite amenable to forming a well-mixed, substantially homogeneous molten plastic material. In addition, there is less likelihood of the shank braking due to the presence of very deep melt channels.

The patent, foreign patent publications, and the article discussed in the specification are intended to be incorporated by reference herein.

It is apparent that there has been provided in accordance with this invention a barrier screw which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A barrier screw for use in a plasticizer which comprises a feed zone having a feed path for receiving plastic material in solid pellet form;
    said feed path being defined by a primary helical flight having a leading edge with a substantially constant pitch and a trailing edge having a pitch different from said leading edge pitch;
    a transition zone for converting said solid plastic material into molten material; and
    a metering zone for mixing molten plastic material from said transition zone.

2. A barrier screw according to claim 1 wherein said primary helical flight extends into said transition zone but said trailing edge has said different pitch only in said feed zone.

3. A barrier screw according to claim 1 wherein said screw has a barrel and said primary flight in said feed zone increases in thickness as one moves along said barrel towards said transition zone so as to improve the conveyance of solids along said screw.

4. A barrier screw according to claim 1 wherein said transition zone has a solids channel and a melt channel, said melt channel being defined by said primary flight and a helical barrier flight.

5. A barrier screw according to claim 4 wherein said feed channel has a desired depth and said solids channel has an initial depth substantially the same as said feed channel depth.

6. A barrier screw according to claim 5 wherein the depth of said solids channel gradually decreases.

7. A barrier screw according to claim 5 wherein said melt channel has an initial depth less than said feed channel depth.

8. A barrier screw according to claim 7 wherein the depth of said melt channel gradually increases.

9. A barrier screw according to claim 4 wherein said primary flight has a substantially constant trailing edge pitch in said transition zone.

10. A barrier screw according to claim 8 having a reduced likelihood of suffering shank braking due to the depth of said melt channel.

* * * * *